United States Patent
Grob-Lipski

(10) Patent No.: US 8,774,812 B2
(45) Date of Patent: Jul. 8, 2014

(54) DETECTING CELL SPOTS

(75) Inventor: Heidrun Grob-Lipski, Starzach (DE)

(73) Assignee: Alcatel Lucent, Paris (FR)

( * ) Notice: Subject to any disclaimer, the term of this patent is extended or adjusted under 35 U.S.C. 154(b) by 215 days.

(21) Appl. No.: 13/390,771

(22) PCT Filed: Aug. 13, 2010

(86) PCT No.: PCT/EP2010/061807
§ 371 (c)(1),
(2), (4) Date: Feb. 16, 2012

(87) PCT Pub. No.: WO2011/020782
PCT Pub. Date: Feb. 24, 2011

(65) Prior Publication Data
US 2012/0157105 A1    Jun. 21, 2012

(30) Foreign Application Priority Data
Aug. 18, 2009   (EP) .................................. 09290631

(51) Int. Cl.
*H04W 36/00*   (2009.01)
(52) U.S. Cl.
USPC .......................................................... 455/437
(58) Field of Classification Search
USPC ..................................... 455/432.1, 436–448
See application file for complete search history.

(56) References Cited

U.S. PATENT DOCUMENTS

2002/0082017 A1* 6/2002 Hattori .......................... 455/436

FOREIGN PATENT DOCUMENTS

| GB | 2 242 806 A | 10/1991 |
| WO | WO 99/57933 A1 | 11/1999 |
| WO | WO 2008/102252 A1 | 8/2008 |

OTHER PUBLICATIONS

International Search Report for PCT/EP2010/061807 dated Oct. 1, 2010.

* cited by examiner

*Primary Examiner* — Joel Ajayi
(74) *Attorney, Agent, or Firm* — Fay Sharpe LLP

(57) ABSTRACT

A method of detecting a cell spot of a first base station in a cellular communication network using a mobile device being moved through the cell spot is provided. The method includes performing a first handover of the mobile device from a second base station to the first base station. A first value indicative of a distance between the mobile device and the first base station is determined. A second handover of the mobile device from the first base station is performed. A second value based on the time between the first and the second handover is determined. Information indicative of the cell spot is stored after determining the first value is above the first threshold and the second value is below the second threshold. A subsequent handover request for performing a handover from the second base station to the first base station is rejected after the information is stored.

20 Claims, 11 Drawing Sheets

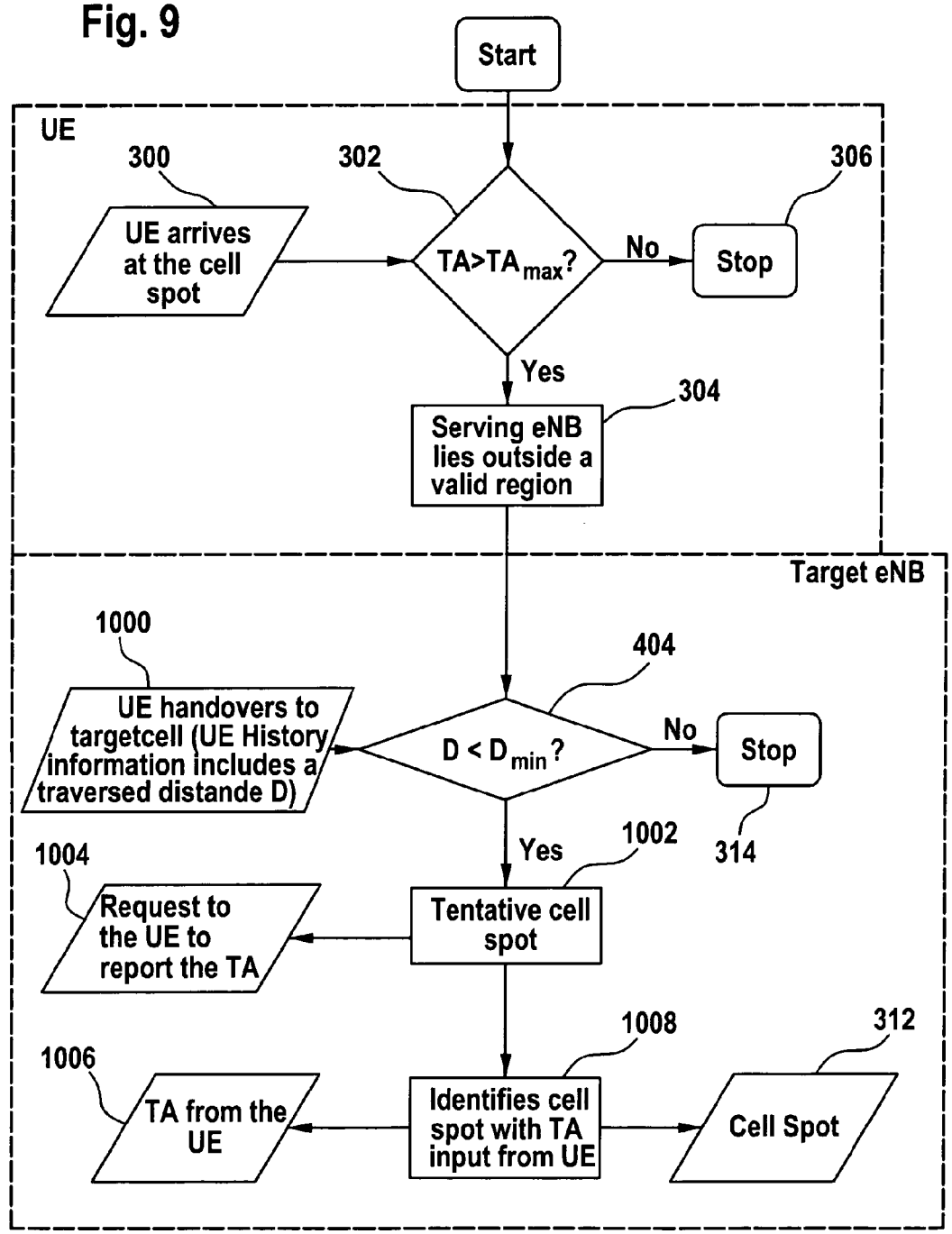

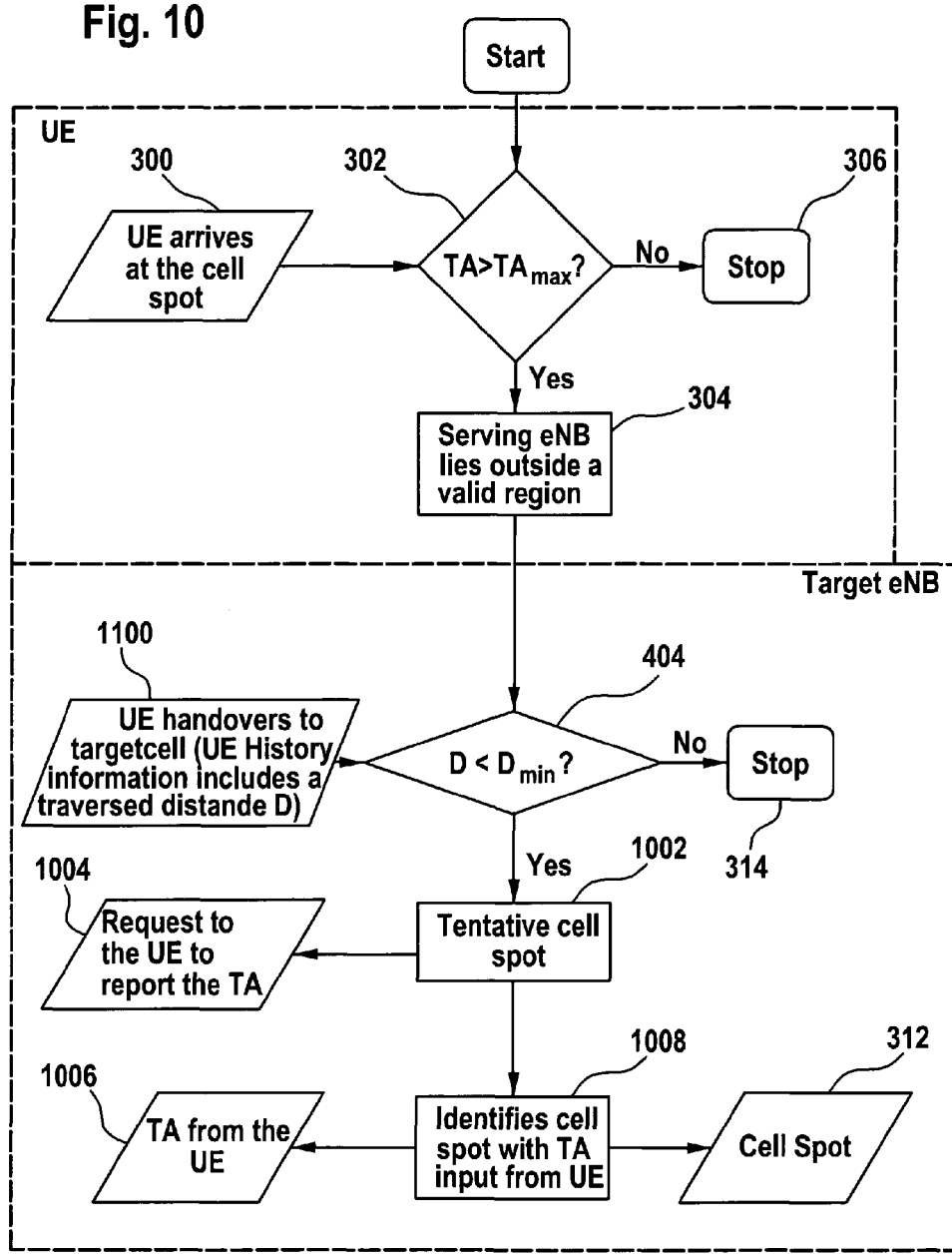

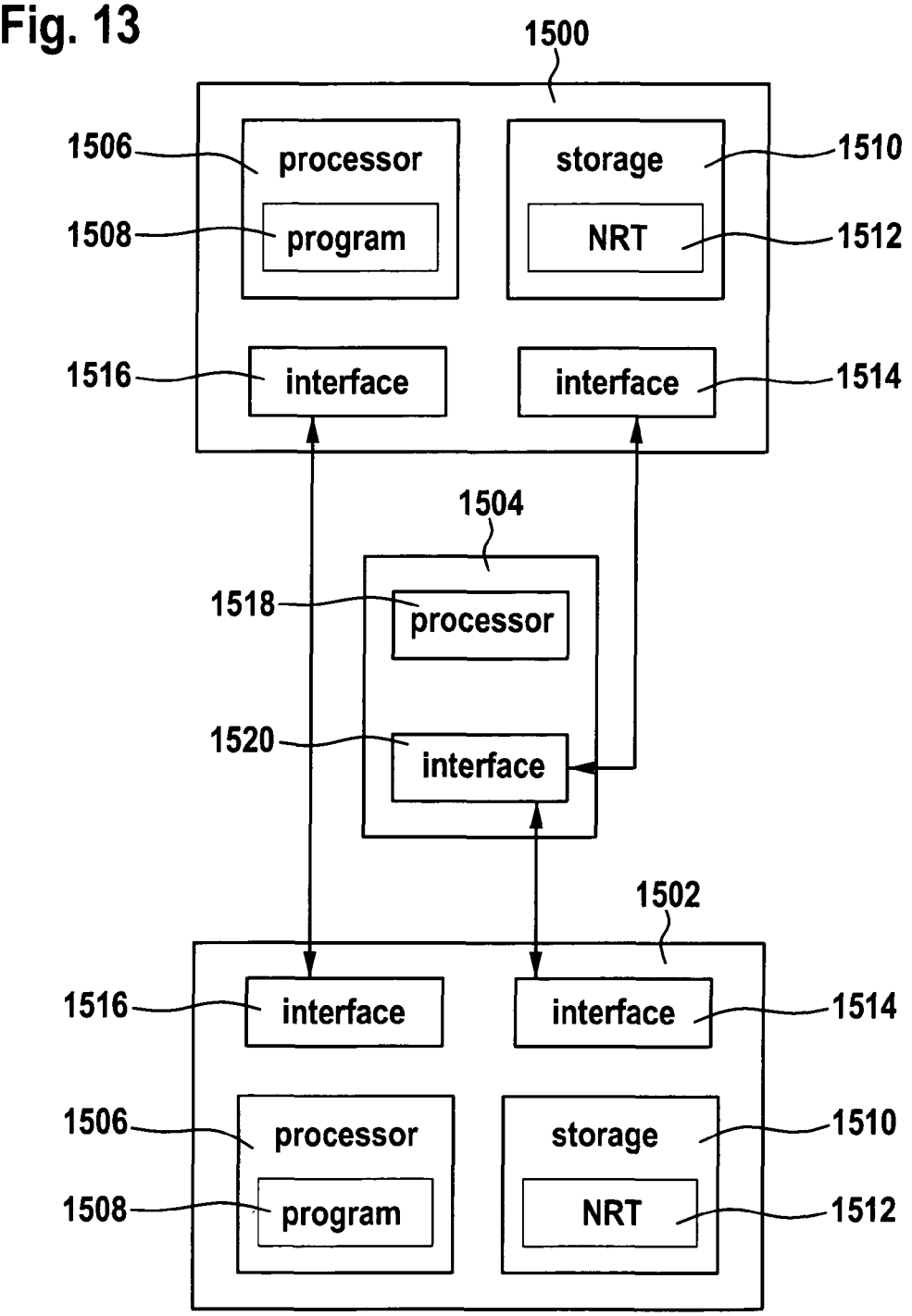

DETECTING CELL SPOTS

FIELD OF THE INVENTION

The present invention relates to a method of detecting a cell spot of a base station in a cellular wireless communication network.

BACKGROUND OF THE INVENTION

In a cellular wireless communication network handovers are performed from one cell of the cellular wireless communication network to another cell based on measurements performed by the mobile device being connected to a base station of the cellular wireless communication network.

A handover to a target base station is performed when the connection to the target base station is better than the connection to the source base station. Usually the target base station is a neighbor base station of the source base station.

SUMMARY OF THE INVENTION

The invention provides a method, a computer program product, a network element and a base station apparatus for detecting a cell spot in the cellular wireless communication network. Embodiments of the invention are given in the dependent claims.

A cell spot is understood herein as a lobe-shaped region of a cell in the cellular network, which is surrounded by at least one cell. The base station of a cell spot is located in a greater distance than the base station of at least one neighboring cell. Preferably, the distance between a mobile device in the cell spot and the base station of the cell spot is double the distance between the mobile device in the cell spot and a base station of the at least one neighboring cell. Usually, a cell spot belongs to a base station serving a common cell of the cellular wireless communication network being located far away from the cell spot.

The term "base station" as used herein refers to any type of fixed network element capable of exchanging data with a mobile device and another base station. The term "mobile device" as used herein refers to any type of mobile communication terminal capable of exchanging data with a radio-communication network on a radio communication link. Consequently, it may be, among other things, a telephone, a laptop computer or personal digital assistant (PDA) equipped with a radio communication interface.

The term "target cell" herein means the target cell of the second handover procedure from the cell spot to a common cell, if no other definition is given.

According to embodiments of the invention, a cell spot is detected and avoided for subsequent handovers. Therefore, the method of detecting a cell spot of a first base station in a cellular wireless communication network uses a mobile device being moved through the cell spot. A first handover of the mobile device from a second base station to the first base station is performed.

A first value is determined, which is indicative of a distance between the mobile device and the first base station. For example, the first value is the timing advance of the communication signal between the mobile device and the first base station. The timing advance is a value being indicative for the signal propagation delay. Thus, from the timing advance the distance between the mobile device and the first base station can be determined.

A second handover of the mobile device from the first base station is performed. The second handover can be performed to the second base station or a third base station. A second value is determined based on the time between the first and the second handover. For example, the second value is the time between the first and the second handover. Another possibility is that the second value is the distance between the first and the second handover.

After the determination of the second value it is determined if the second value is below a second threshold. If the first value is above the first threshold and the second value is below the second threshold information is stored, which is indicative of the cell spot. Subsequent handover requests for performing a handover from the second base station to the first base station are rejected if the information is stored.

The first value is indicative of the distance between the mobile device and the first base station. Thus, when the first value is above the first threshold, this means that the distance between the mobile device and the first base station is bigger than a predetermined maximum value. The second value is based on the time between the first and the second handover. Thus, when the second value is below the second threshold, this means that the time between the first and the second handover was shorter than a minimum value. These two conditions are the criteria for detecting a cell spot. A cell spot is detected, when the base station serving the cell spot is located in a bigger distance than a predetermined value and the cell spot is smaller than a second predetermined value.

Hence, according to embodiments of the invention cell spots are identified and avoided for subsequent handovers. This is advantageous because mobile devices perform handovers very quickly in sequence when the first handover is performed to a cell spot. As a result, handovers into cell spots are often performed in vain and system resources are wasted. For this, handovers to traverse those cell spots have to be identified and omitted, for example with an entry into the neighbor relation table.

According to embodiments of the invention, other base stations are prepared for a handover after the handover to a cell spot is rejected.

According to embodiments of the invention, the handover parameters of a mobile device are modified when it approaches the cell spot in order to delay a handover to the first base station, which serves the cell spot. This is advantageous because a connection with the first base station is avoided as long as desired and may be completely avoided. If the handover to the first base station can not be avoided, for example because the quality of the connection to all other base stations is below a certain threshold, a handover to the first base station is performed despite the source base station knows that the handover is performed to a cell spot.

In accordance with embodiments of the invention, the first value is the timing advance of the communication signal between the mobile device and the first base station. The timing advance is a value being indicative for the distance between the mobile device and the first base station. Thus, when the timing advance exceeds a maximum value, this means that the distance between the first base station and the mobile device is bigger than a predetermined maximum distance. This is the first criterion for identifying cell spots.

According to embodiments of the invention the second value is the time between the first and the second handover. Thus, when the time between the first and the second handover is shorter than a predetermined minimum value, a second criterion for a cell spot is fulfilled.

In accordance with embodiments of the invention the second value is the distance the mobile device was moved between the first and the second handover. Therefore, the base station determines regularly the timing advance from the uplink received timing of the mobile device. As described above, the timing advance is indicative for the distance between the mobile device and the base station. Further, the base station determines the direction of the communication with the mobile device. After determining the direction of the communication in the moment of the first handover and in the moment of the second handover, the angle between these two directions is determined. Thus, the base station knows the distance the mobile device was moved towards the base station or away from the base station between the first and the second handover and the angle between the signal directions of the first and the second handover.

From these two values, the total distance the mobile device was moved is calculated by $a^2=b^2+c^2-2bc*\cos(\alpha)$, wherein b is the distance between the mobile device and the first base station in the moment of the first handover, c is the distance between the mobile device and the first base station in the moment of the second handover and $\alpha$ is the angle between the two signal directions. According to embodiments of the invention the calculated distance is transmitted from the base station of the cell spot to the target base station during the handover procedure.

In other words, according to embodiments of the invention a cell spot is detected when two criteria are fulfilled. The first criterion is the distance of the mobile device to the base station serving the cell spot. The second criterion is the size of the cell spot, which is determined by a value based on the timing advance between the first and the second handover.

According to embodiments of the invention statistics about detected cell spots are stored in the second base station. Thus, subsequent handovers to the first base station of the cell spot are only avoided if a sufficient number of mobile devices have detected the cell spot. This is advantageous because one erroneous detection of a cell spot does not result in avoiding subsequent handovers.

According to embodiments of the invention the information is stored in a neighbor relation table. For example, the neighbor relation table, where the information is stored, is located in the first or in the second or in a third base station. The information identifies the cell spot. For example, a cell spot is located within another cell. This means the cell spot is surrounded by only one cell. Thus, the first handover is performed from the cell surrounding the cell spot to the cell spot. The second handover is performed from the cell spot to the surrounding cell. According to embodiments of the invention the information being indicative for the cell spot is stored in the neighbor relation table of the base station serving the surrounding cell. This means that in the neighbor relation table the cell identity of the cell spot is marked as being a cell spot and handovers to the cell spot are rejected.

In accordance with embodiments of the invention the information is stored in the first base station serving the cell spot being surrounded by another cell. If for example a handover from the surrounding cell shall be performed to the cell spot, the base station of the cell spot rejects the handover request.

In accordance with embodiments of the invention the information is stored in the second base station. Preferably it is stored in the neighbor relation table of the second base station. In this case, no subsequent handovers to the cell spot are performed.

According to embodiments of the invention the information is stored in a third base station. Preferably it is stored in the neighbor relation table of the third base station. For example, the cell spot is located in a region, where a cell of a second base station overlaps with a cell of a third base station. The cell spot is served by the first base station, the first cell is served by the second base station and the second cell is served by the third base station. When a mobile device is located in the first cell and is moved towards the cell spot and the overlapping second cell, a first handover is performed from the first cell to the cell spot before a second handover is performed from the cell spot to the second cell. Thus, for example by knowing the traversed distance of the mobile device in the cell spot, the third base station detects the cell spot.

According to embodiments of the invention the time between the first and the second handover is transmitted to a base station or a central network element by a signal from the base station to another base station or the central network element. For example, the history information of the last visited cells is included in the handover request message. The history information comprises a list of the last visited cells including the last visited cell information with the global cell ID, cell type and time the mobile device stayed in cell.

According to embodiments of the invention the information is stored in a network element. Preferably, the base station of the cell spot sets up a signal including cell spot information, for example the timing advance and the time between the first and the second handover or information identifying the cell spot as a cell spot, and transmits the signal to the central network element in order to initiate appropriate measures. Appropriate measures can be, for example, avoiding handovers into the cell spot.

This signal can be transmitted on occasion, periodically or at request. A transmission on occasion would mean, that the base station of the cell spot informs the central network element when the cell spot is detected. A periodical transmission means that the base station transmits periodically information about cell spots to the central network element. Transmission at request means that the central network element requests information about detected cell spots from the base station serving the cell spot.

In another aspect the invention relates to a computer program product comprising machine executable instructions for performing the following steps. Perform a first handover of the mobile device from a second base station to a first base station; determine a first value, the first value being indicative of a distance between the mobile device and the first base station; determine if the first value is above a first threshold; perform a second handover of the mobile device from the first base station; determine a second value based on the time between the first and the second handover; determine if the second value is below a second threshold; store information being indicative of the cell spot if the first value is above the first threshold and the second value is below the second threshold; reject a subsequent handover request for performing a handover from the second base station to the first base station, if the information is stored.

According to embodiments of the invention, other base stations are prepared for a handover after the handover to a cell spot is rejected In another aspect the invention relates to a network element being operable to perform the following steps. Perform a first handover of the mobile device from a second base station to a first base station; determine a first value, the first value being indicative of a distance between the mobile device and the first base station; determine if the first value is above a first threshold; perform a second handover of the mobile device from the first base station; determine a second value based on the time between the first and the second handover; determine if the second value is below a second threshold; store information being indicative of the cell spot if the first value is above the first threshold and the second value is below the second threshold; reject a subsequent handover request for performing a handover from the second base station to the first base station, if the information is stored.

According to embodiments of the invention, other base stations are prepared for a handover after the handover to a cell spot is rejected In another aspect the invention relates to a base station apparatus being operable to perform the following steps. Perform a first handover of the mobile device from a second base station to a first base station; determine a first value, the first value being indicative of a distance between the mobile device and the first base station; determine if the first value is above a first threshold; perform a second handover of the mobile device from the first base station; determine a second value based on the time between the first and the second handover; determine if the second value is below a second threshold; store information being indicative of the cell spot if the first value is above the first threshold and the second value is below the second threshold; reject a subsequent handover request for performing a handover from the second base station to the first base station, if the information is stored.

According to embodiments of the invention, other base stations are prepared for a handover after the handover to a cell spot is rejected A person of skill in the art would readily recognize that steps of various above described methods can be performed by programmed computers. Herein, some embodiments are also intended to cover program storage devices, for example digital data storage media, which are machine or computer readable and encode machine executable or computer executable programs of instructions, wherein said instructions perform some or all of the steps of said above described methods. The program storage device may be, for example, digital memories, magnetic storage media such as magnetic discs and magnetic tapes, hard drives, or optically readable digital data storage media. The embodiments are also intended to cover computers programmed to perform said steps of the above described methods.

BRIEF DESCRIPTION OF THE DRAWINGS

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Some embodiments of methods and apparatuses in accordance with embodiments of the present invention are now described, by way of example only, and with reference to the accompanying drawings in which:

FIG. 9 shows a flowchart of cell spot identification in the target base station of the second handover;

FIG. 10 shows a flowchart of cell spot identification in the target base station of the second handover;

FIG. 13 shows a block diagram of two base stations and a mobile device; and

DETAILED DESCRIPTION OF THE DRAWINGS

Figure 1:
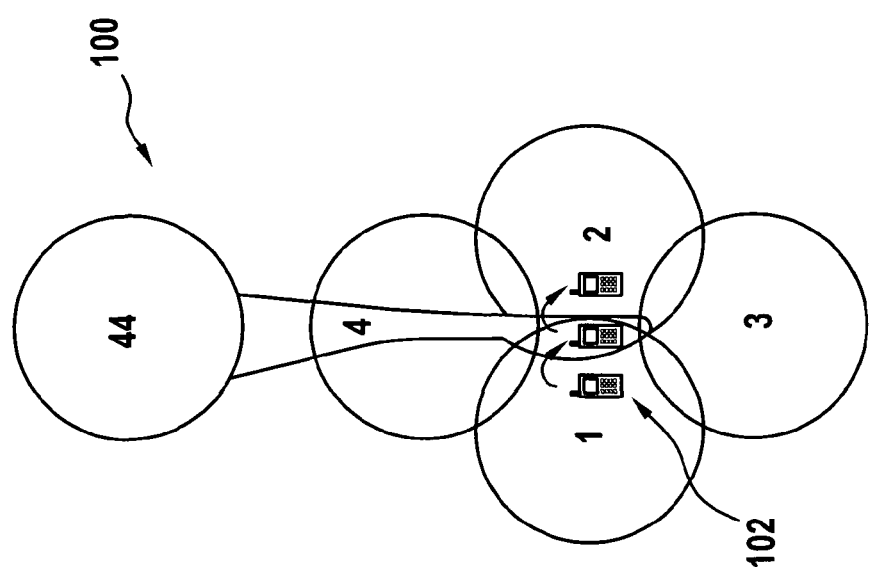
FIG. 1 shows a schematic view of a cellular wireless communication network comprising a cell spot.

FIG. 1 shows a schematic view of a part of a cellular wireless communication network 100 comprising four cells 1-4 and a cell spot of a fifth cell in the overlapping region of cells 1 and 2. A mobile device 102 is moved from cell 1 towards the cell spot of cell 44 and cell 2.

When the mobile device reaches the cell spot of cell 44 a handover from cell 1 to cell 44 is performed. Then, after a very short sojourn time a second handover from cell 44 to cell 2 is performed. With each handover request message the history information of the mobile device is transmitted to the target cell, which is the target cell of the second handover, i.e. in this case cell 2. The history information comprises the last visited cell list including last visited cell information with the cell identity, the cell type and the time the mobile device stayed in the cell. Thus, in the handover request message for the second handover from cell 44 to cell 2, the history information of the mobile device 102 comprises the time the mobile device 102 stayed in cell 44. Thereby, the base station of cell 2 knows the sojourn time of the mobile device 102 in the cell spot of cell 44.

Figure 2:
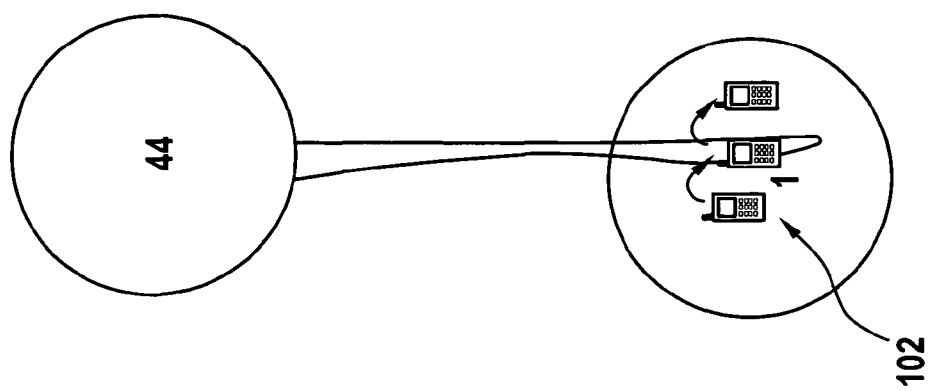
FIG. 2 shows a schematic view of a cell in a cellular wireless communication network comprising a cell spot.

FIG. 2 shows a schematic view of a part of a cellular wireless communication network comprising a cell 1 and a cell 44 with a cell spot of cell 44 in cell 1. A mobile device 102 is moved in cell 1 towards the cell spot of cell 44 and afterwards the mobile device 102 is moved out of the cell spot of cell 44 towards cell 1 again.

When the mobile device reaches the cell spot of cell 44, a first handover from cell 1 to cell 44 is performed. Then, after a very short sojourn time a second handover from cell 44 to cell 1 is performed. As described above, the history information is transmitted to the base station serving cell 1 during the second handover procedure.

The timing advance is measured by the base station serving cell 44 from the uplink received timing and is transmitted to the mobile device. The mobile device uses the timing advance to advance or delay its transmission instances to the base station in order to compensate for propagation delay.

Figure 3:
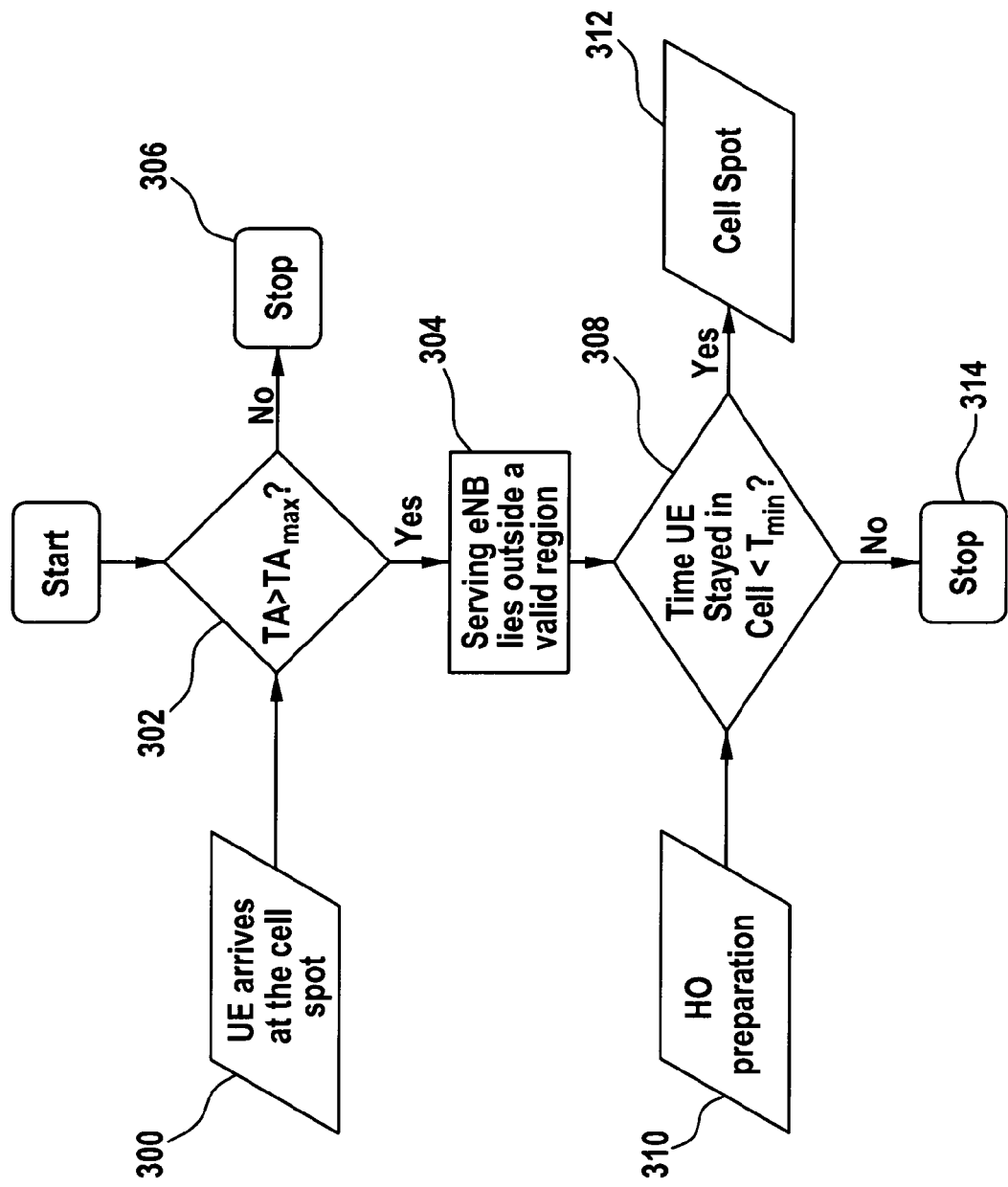
FIG. 3 shows a flowchart of cell spot identification in the base station of the cell spot.

FIG. 3 shows a flowchart of cell spot identification in the base station of the cell spot. In step 300 the mobile device arrives at the cell spot. The mobile device is depicted as a UE, which means user equipment. The serving base station, which is the base station of the cell spot, checks the timing advance in step 302. If the timing advance exceeds a predefined maximum value, $TA_{max}$, step 304 is performed. In step 304 the base station of the cell spot is identified to lie outside a valid region for this mobile device. The base station is depicted as an eNB, which means evolved Node B, a base station in a UMTS network. In principle, any kind of base station in a cellular wireless communication network can be operated in the described way. If the timing advance is not above the threshold $TA_{max}$, the procedure is stopped in step 306.

In step 308 the base station compares the time the mobile device stayed in the cell with a minimum threshold $T_{min}$. The time the mobile device stayed in the cell is known from step 310, the handover preparation from the base station of the cell spot to another base station. Within the handover preparation message the mobile device's history information is transmitted to the base station. The mobile device's history information comprises the time the mobile device stayed in the cell.

If the time the mobile device stayed in the cell is under the threshold $T_{min}$, the cell spot is detected in step 312. If the time the mobile device stayed in the cell is above the threshold $T_{min}$ the procedure is stopped in step 314.

Figure 4:
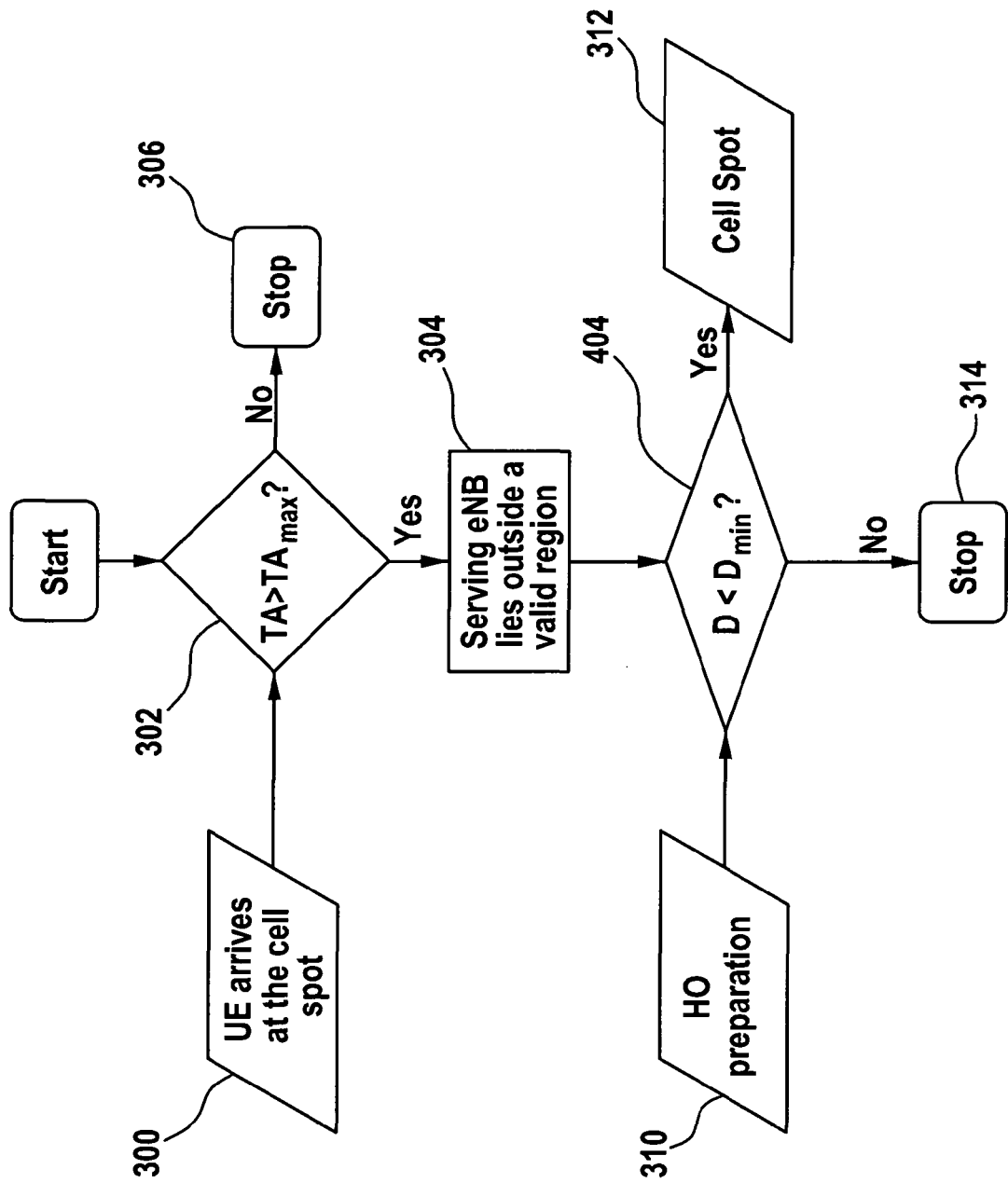
FIG. 4 shows a flowchart of a cell spot identification in the base station of the cell spot.

FIG. 4 shows a flowchart of cell spot identification in the base station of the cell spot. It is an alternative way to identify a cell spot. In step 300 the mobile device arrives at the cell spot. The mobile device is depicted as a UE, which means user equipment. In step 302 the timing advance is compared to the threshold $TA_{max}$ as described in FIG. 3. If the timing advance is above the threshold $TA_{max}$, the serving base station is defined as lying outside a valid region. The base station is depicted as an eNB, which means evolved node B. If the timing advance is not above the threshold $TA_{max}$, the procedure is stopped in step 306.

The distance D the mobile device was moved in the cell spot is known to the base station from the handover preparation procedure in step 310 as described above. During the handover preparation procedure the distance D is transmitted from the base station of the cell spot to the target base station. The distance D is determined by the base station of the cell spot as described above based on the measurements of the timing advance and the angle of the signal direction.

In step 404 the distance D is compared with a minimum threshold $D_{min}$. If the distance D is below the threshold $D_{min}$, the cell spot is detected in step 312. This leads to the storage of information indicating the cell spot, for example in a neighbor relation table. If the distance is above the threshold $D_{min}$ the procedure is stopped in step 314.

Figure 5:
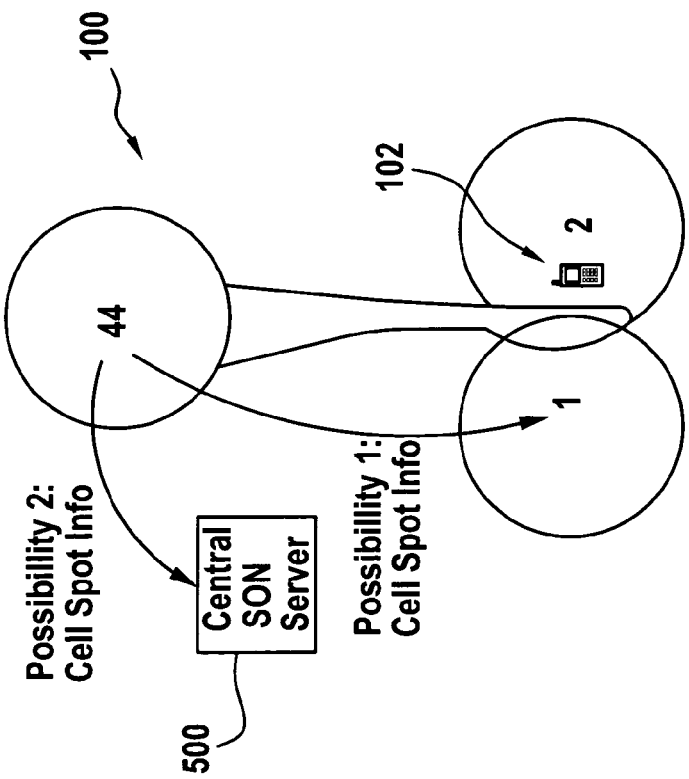
FIG. 5 shows a schematic view of a part of a cellular wireless network comprising a cell spot and a central network element.

FIG. 5 shows a schematic view of a part of a cellular wireless communication network 100 comprising three cells 1, 2 and 44 and a mobile device 102. Further the network comprises a central network element 500, depicted as central SON server. The cell 44 comprises a cell spot in the overlapping region of cells 1 and 2.

FIG. 5 shows two possibilities to provide the cell spot information detected by the base station of the cell comprising the cell spot. The first possibility is to inform the base station of cell 1, which for example stores the information in its neighbor relation table. The information about the cell spot can be transmitted from the base station of cell 44 to the base station of cell 1 via an X2 interface for example. When the information about the cell spot of cell 44 is stored in the base station of cell 1 subsequent handover procedures to cell 44 from cell 1 are avoided by the base station of cell 1.

The second possibility is that the base station of cell 44 informs the central network element 500 about the cell spot and the central network element 500 stores the information and avoids subsequent handover procedures from cell 1 to cell 44.

The messages to the central network element or the base station of cell 1 can be transmitted on occasion, periodically or at request.

Further, the base station of cell 44 identifies whether the new target cell 2 differs from the former source cell 1. This can for example be done by the history information of the mobile device comprising cells, to which the mobile device was connected before.

The cell spot information transmitted from the base station of cell 44 to the base station of cell 1 or to the central network element 500 can be for example that the cell spot of cell 44 is detected. Another possibility is to transmit the timing advance, traversed distance or the time that the mobile device spent in the cell spot and the new target cell.

Figure 6:
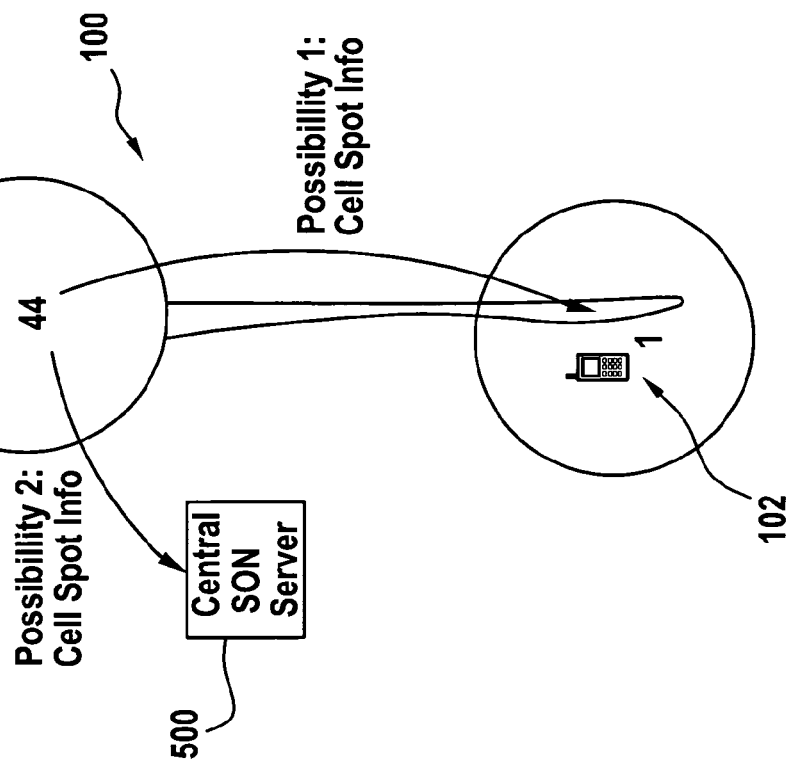
FIG. 6 shows a schematic view of a part of a cellular wireless communication network comprising a cell spot and a central network element.

FIG. 6 shows a part of a cellular wireless communication network 100 comprising a cell 1 and a cell 44 and a mobile device 102 and a central network element 500. The cell spot of cell 44 is surrounded by cell 1. As described above in FIG. 5 the base station identifies whether the new target cell 1 is identical with the former source cell 1. The information about the cell spot can be transmitted to the base station of cell 1 or to the central network element 500. As described above in FIG. 5 the cell spot information can be that the cell spot is detected or the cell spot information can comprise the timing advance, the traversed distance of the mobile device in the cell spot or the time the mobile device spent in the cell spot and the new target cell 1, which is identical with the former source cell 1. The information can be stored in the neighbor relation table.

As the time the mobile device stayed in the cell spot is already transmitted in the mobile device's history information of the handover request message, the base station of the cell spot of cell 44 includes residual cell spot information, for example timing advance and/or the the traversed distance of the mobile device in the cell spot, into the handover request message and transmits it to the former source base station, which is identical to the new target base station, to take appropriate measures.

The messages to the central network element or the base station of cell 1 can be transmitted on occasion, periodically or at request.

Figure 7:
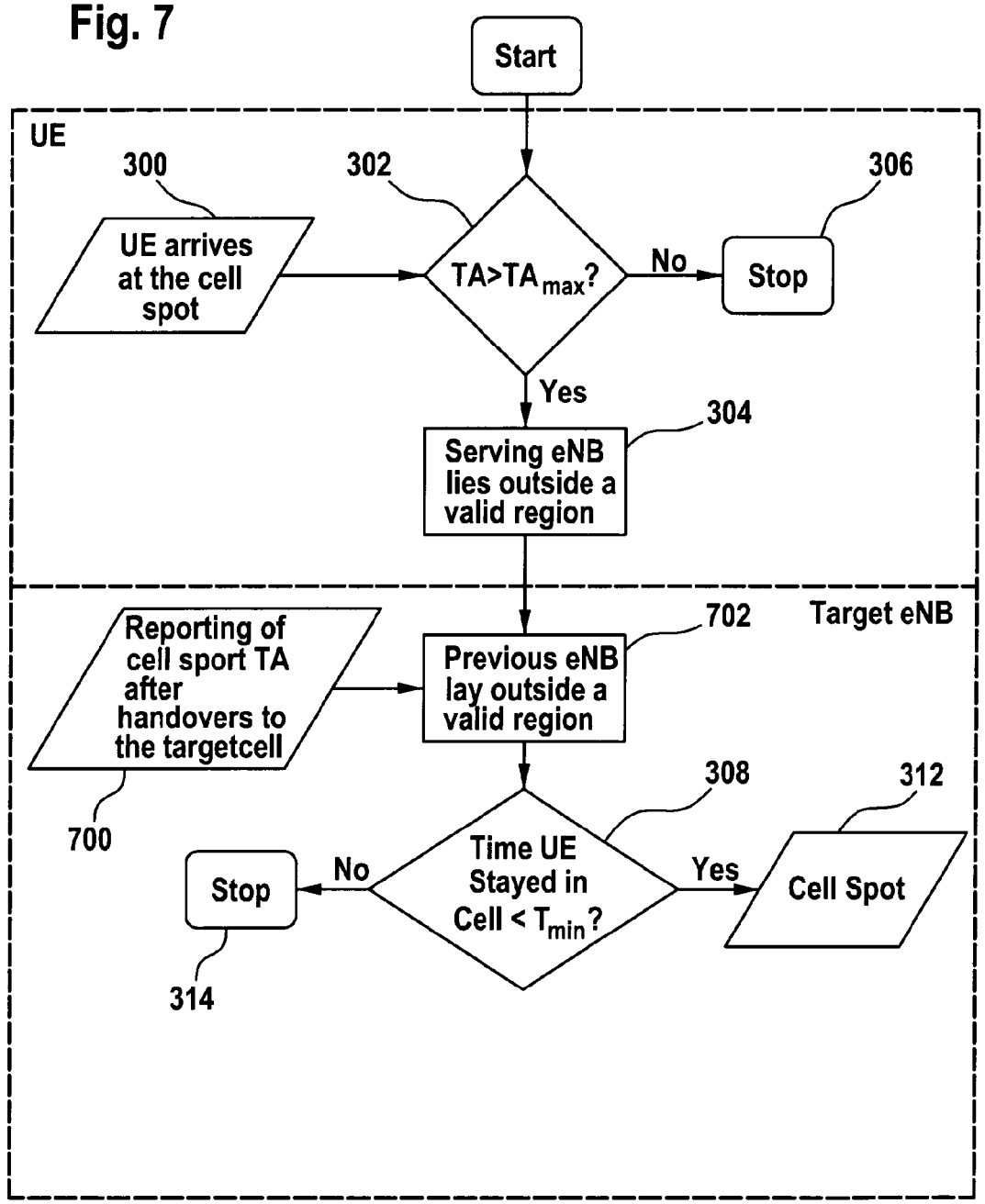
FIG. 7 shows a flowchart of cell spot identification in the target base station of the second handover.

FIG. 7 shows a flowchart of cell spot identification in the target base station by autonomous reporting of the timing advance. In step 300 the mobile device arrives at the cell spot. As soon as the mobile device arrives at the cell spot the mobile device checks, whether the timing advance exceeds the predefined maximum value $TA_{max}$ in step 302. If so, the base station is identified to lie outside the valid region for this mobile device in step 304. The mobile device stores the timing advance information. If the timing advance information is not above the threshold $TA_{max}$ the procedure is stopped in step 306.

After having determined that the base station lies outside the valid region in step 304 the mobile device hands over from the cell spot into the target cell. As soon as the mobile device is handed over to the target base station the mobile device reports the timing advance of the cell spot autonomously to the base station in step 700.

Then, in step 702 the base station knows that the previously visited cell was outside the valid region. The target base station derives the time the mobile device stayed in the cell from the handover request message received from the base station of the cell spot and checks whether the time the mobile device stayed in the cell falls below a predefined minimum value $T_{min}$ in step 308. If this is the case the target base station identifies a cell spot in step 312 and information about the cell spot is stored, for example in the neighbor relation table. If this is not the case the procedure is stopped in step 314.

Figure 8:
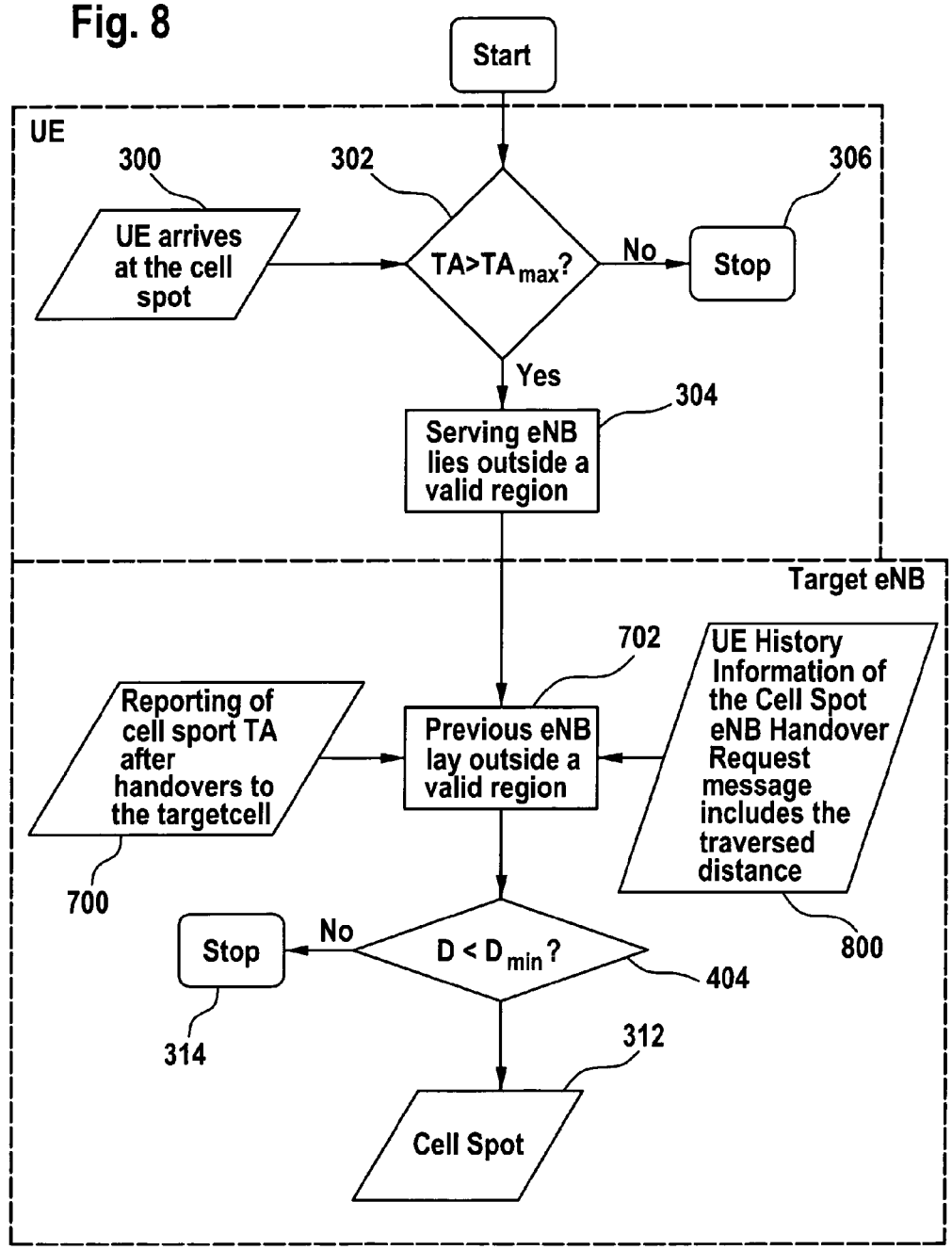
FIG. 8 shows a flowchart of cell spot identification in the target base station of the second handover.

FIG. 8 shows a flowchart of cell spot identification in the target base station by autonomous reporting of the timing advance. The cell spot is identified in FIG. 8 according to the traversed path length in the cell spot. The mobile device arrives as described above in step 300 at the cell spot. In step 302 the timing advance is compared with the maximum value $TA_{max}$. If the timing advance is below $TA_{max}$ the procedure is stopped in step 306, if the timing advance is above the threshold the serving base station is detected to lie outside a valid region in step 304. The timing advance of the cell spot is reported to the target base station after the handover to the target cell in step 700. Then, in step 702 the target base station knows that the previous base station lay outside a valid region.

In step 800 the mobile device's history information is received by the target base station. In this case, the traversed distance D of the mobile device has to be included into the mobile device's history information of the handover request message during preparation of handover from the cell spot base station to the target base station. The time the mobile device stayed in former cells is always included in the mobile device's history information. Thus the target base station knows the time the mobile device stayed in the cell and the traversed distance of the mobile device.

In step 404 the distance D is compared to a minimum threshold $D_{min}$. If the distance is shorter than the threshold the base station identifies the cell spot in step 312 and stores respective information. If the distance is longer than the minimum distance $D_{min}$ the procedure is stopped in step 314.

FIG. 9 shows a flowchart of cell spot identification in the target base station by reporting of the timing advance after request. The mobile device arrives at the cell spot in step 300. In step 302 the timing advance is compared to the maximum threshold $TA_{max}$. If the timing advance is below the threshold the procedure is stopped in step 306. If the timing advance is above the threshold $TA_{max}$ the serving base station is identified as lying outside a valid region in step 304.

The mobile device hands over to the target cell in step 1000. During the handover procedure the mobile device's history information is transmitted to the target base station including the time the mobile device stayed in the previous cell. In step 308, the time the mobile device stayed in the previous cell is compared to the minimum threshold $T_{min}$. If the time is above the threshold $T_{min}$ the procedure is stopped in step 314. If the time the mobile device stayed in the cell is below the threshold $T_{min}$ the previous cell is detected as a tentative cell spot 1002.

Then, in step 1004 a request to report the timing advance is transmitted to the mobile device. On this request the mobile device transmits the timing advance from the connection with the former cell in step 1006 to the base station of the target cell. In step 1008 the timing advance is used to identify the cell spot. In step 312 the cell spot is detected as a cell spot and the information about the cell spot is stored.

FIG. 10 shows a schematic view of cell spot identification in the target base station by reporting of the timing advance after request. The mobile device arrives at the cell spot in step 300. In step 302 the timing advance is compared to the maximum value $TA_{max}$. If the timing advance is above the threshold, the serving base station lies outside a valid region, step 304. If the timing advance is below the threshold the procedure is stopped in step 306.

In step 1100 the mobile device hands over to the target cell. During the handover procedure the mobile device's history information is transmitted to the new target base station. The history information includes the traversed distance D in the previous cell.

In step 404 the calculated distance is compared to a minimum threshold $D_{min}$. If the distance is above the threshold $D_{min}$ the procedure is stopped in step 314. If the distance is below the threshold $D_{min}$ the previous cell is identified as a tentative cell spot in step 1002. In step 1004 a request to the mobile device to report the timing advance of the connection to the previous base station is transmitted to the mobile device. In step 1006 the timing advance is transmitted from the mobile device to the serving target base station. In step 1008 the tentative cell spot is identified with the timing advance input from the mobile device. In step 312 the cell spot is identified as a cell spot and the information is stored.

Figure 11:
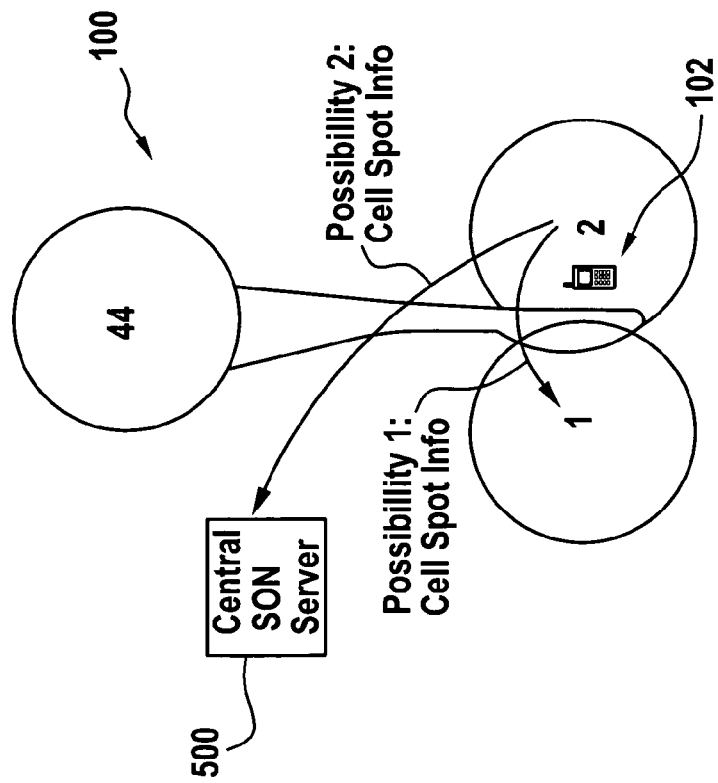
FIG. 11 shows a schematic view of a part of a cellular wireless communication network comprising a cell spot and a central network element.

FIG. 11 shows a schematic view of a part of a cellular wireless communication network 100 comprising three cells 1, 2 and 44, a mobile device 102 and a central network element 500. The cell 44 comprises a cell spot being located in the overlapping region of the cells 1 and 2.

The cell spot is detected by the base station of cell 2, i.e. the target base station. The base station of cell 2 identifies whether the target cell 2 differs from the former source cell 1. The cell spot information can be transmitted to a central network element 500 or to the base station of cell 1. The information can be transmitted via an X2 interface, the signal being sent via the X2 interface including cell spot information, for example timing advance and traverse distance. The former source base station can be identified by the mobile device's history information. The signal can be transmitted on occasion, periodically or at request.

Figure 12:
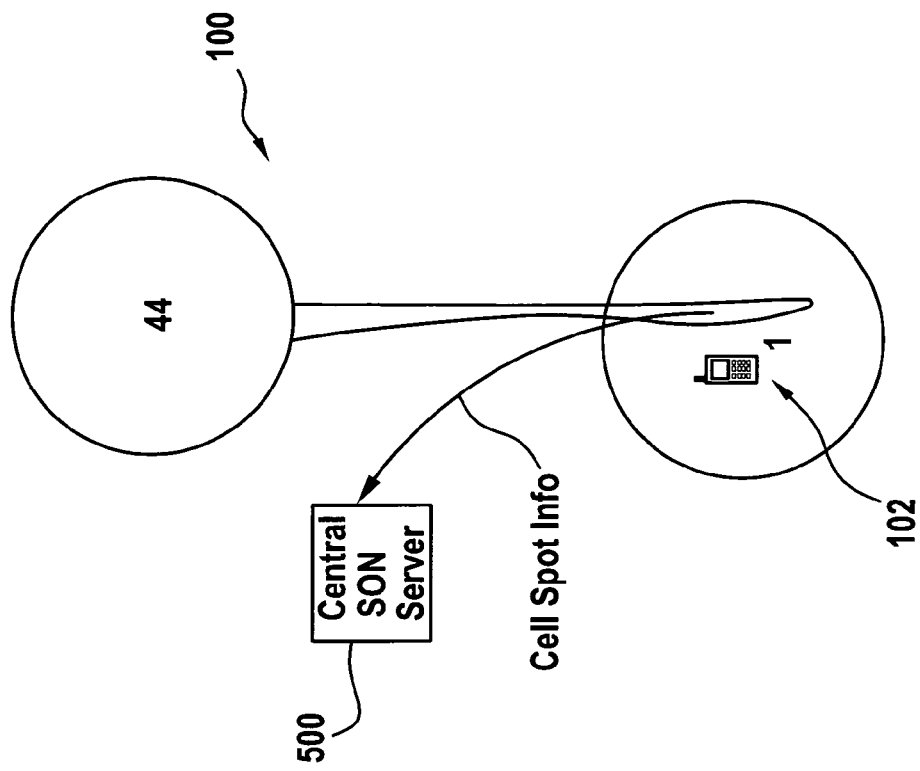
FIG. 12 shows a part of a cellular wireless communication network comprising a cell surrounding a cell spot and a central network element.

FIG. 12 shows a schematic view of a part of a cellular wireless communication network 100 comprising two cells 1 and 4, a mobile device 102 and a central network element 500. The cell 44 comprises a cell spot within the area of cell 1.

The base station of cell 1 identifies that the target cell 1 is identical to the former source cell 1. The cell spot information can be stored in the base station of cell 1 or it can be transmitted to the central network element 500. The signal being sent to the central network element 500 can include the timing advance and the sojourn time or the traversed distance in the cell spot. The signal can be transmitted on occasion, periodically or at request.

FIG. 13 shows a block diagram of two base stations 1500 and 1502 and a mobile device 1504. Each base station comprises a processor 1506, which is adapted to execute a program 1508, a storage 1510, where the neighbor relation table 1512 is stored, and two interfaces 1514 and 1516 for communicating with other base stations and with the mobile device 1504. The mobile device comprises a processor 1518 and an interface 1520 for communicating with the base stations.

It is to be noted that the base stations 1500 and 1502 are able to perform the same procedures. In operation, the mobile device 1504 is connected to the first base station 1500 via the interfaces 1514 and 1520. When the mobile device 1504 is moved towards the cell spot of the cell of the second base station 1502, a handover procedure is initiated. When the mobile device 1504 is connected via the interface 1520 and 1514 to base station 1502, base station 1502 measures the timing advance. After a very short time the mobile device 1504 has been moved through the cell spot of base station 1502 and a handover back to base station 1500 is initiated.

Due to the mobile device's history information being sent to the base station 1500 during the second handover procedure, the base station 1500 knows the sojourn time of the mobile device in the cell spot of base station 1502 and optionally the traversed distance of the mobile device 1504 in the cell spot. The timing advance measured by base station 1502 is also transmitted to base station 1500, either via the mobile device 1504 or directly from base station 1502 to base station 1500 via the interfaces 1516. The processor 1506 of base station 1500 executes a program 1508 which performs the method steps described above. Based on this program, the timing advance, the sojourn time of the mobile device 1504 and optionally the traversed distance of the mobile device 1504, the base station 1500 detects the cell spot of base station 1502. Information about this cell spot is stored in storage 1510 of base station 1500 or can also be transmitted to base station 1502 or another base station not depicted. The information preferably is stored in the neighbor relation table 1512.

Figure 14:
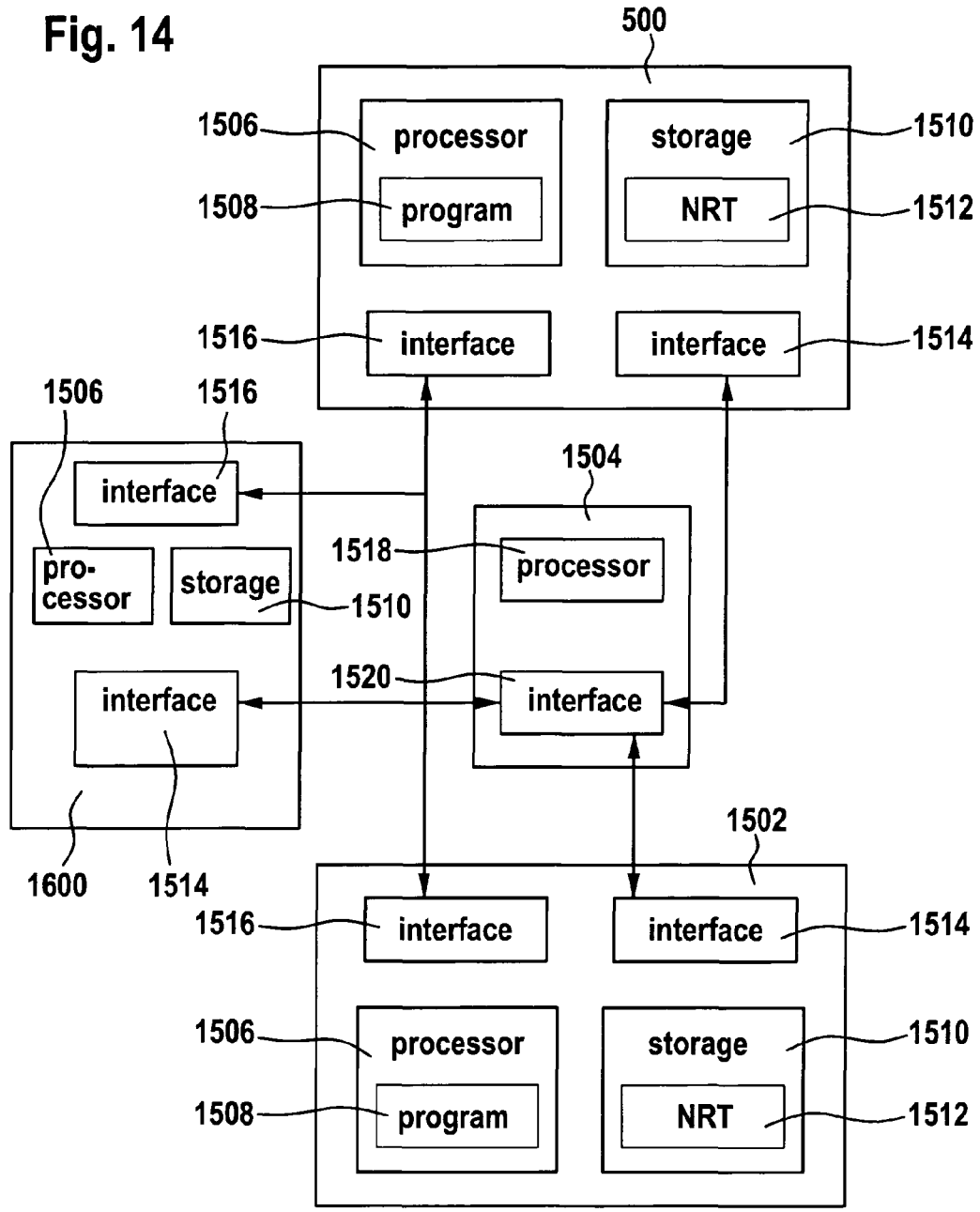
FIG. 14 shows a block diagram of a base station, a central network element and a mobile device.

FIG. 14 shows a block diagram of a central network element 500, a mobile device 1504 and two base stations 1502 and 1600. The base station 1502 comprises a processor 1506, which is adapted to execute a program 1508, a storage 1510, where the neighbor relation table 1512 is stored, and two interfaces 1514 and 1516 for communicating with the central network element 500, with the base station 1600 and with the mobile device 1504. The mobile device comprises a processor 1518 and an interface 1520 for communicating with the base stations 1502 and 1600 and the central network element 500. The base station 1600 comprises two interfaces 1514 and 1602 for communicating with the base station 1502, the central network element 500 and the mobile device 1504. Further, the base station 1600 comprises a processor 1506 and a storage 1510.

In operation, the mobile device 1504 is connected to the base station 1502 via the interfaces 1514 and 1520. When the mobile device 1504 is moved towards a cell spot of base station 1600, a handover procedure is initiated. When the mobile device 1504 is connected via the interfaces 1520 and 1514 to the base station 1600 of the cell spot, the base station 1600 of the cell spot measures the timing advance. After a very short time the mobile device 1504 has been moved through the cell spot and a handover back to base station 1500 is initiated.

Due to the mobile device's history information being sent to the base station 1502 during the second handover procedure, the base station 1502 knows the sojourn time of the mobile device in the cell spot of base station 1600 and optionally the traversed distance of the mobile device 1504 in the cell spot. The timing advance measured by base station 1600 is also transmitted to base station 1500, either via the mobile device 1504 or directly from base station 1600 to base station 1502 via the interfaces 1516. All information about the cell spot is transmitted from base station 1502 to the central network element 500, comprising the timing advance, the sojourn time and optionally the traversed distance of the mobile device 1504.

The processor 1506 of the central network element 500 executes a program 1508 which performs the method steps described above. Based on this program, the timing advance, the sojourn time of the mobile device and the cell spot and optionally the traversed distance of the mobile device the central network element 500 detects the cell spot of base station 1600. Information about this cell spot is, for example, stored in storage 1510 of base station 1502 or can also be transmitted to base station 1600 or another base station not depicted. Preferably, the information is stored in the neighbor relation table 1512.

LIST OF REFERENCE NUMERALS

1 Cell
2 Cell
3 Cell
4 Cell
44 Cell
100 Cellular wireless communication network
102 Mobile device
300 Mobile device arrives at cell spot
302 Timing advance above threshold
304 Serving base station outside valid region
306 Stop
308 Time below threshold
310 Handover preparation
312 Detected cell spot
314 Stop
404 Distance below threshold
500 Central network element
700 Reporting of cell spot timing advance after handover to the target cell
702 Previous base station outside valid region
800 Receiving handover history information
1000 Mobile device hands over to new target cell
1002 Detecting tentative cell spot
1004 Sending request to the mobile device to report timing advance
1006 Receiving timing advance from mobile device
1008 Identifying cell spot with input from mobile device
1100 Handover of mobile device and transmitting speed
1500 Base station
1502 Base station
1504 Mobile device
1506 Processor
1508 Program
1510 Storage
1512 Neighbor relation table
1514 Interface
1516 Interface
1518 Processor
1520 Interface
1600 Base station
1602 interface

The invention claimed is:

1. A method of detecting a cell spot of a first base station in a cellular wireless communication network using a mobile device being moved through the cell spot, the method comprising:
    performing a first handover of the mobile device from a second base station to the first base station;
    determining a first value, the first value being indicative of a distance between the mobile device and the first base station;
    performing a second handover of the mobile device from the first base station;
    determining a second value based on the time between the first and the second handover;
    storing information indicative of the cell spot after determining the first value is above the first threshold and the second value is below the second threshold; and
    rejecting a subsequent handover request for performing a handover from the second base station to the first base station after the information is stored.

2. The method of claim 1, wherein at least one third base station is prepared for a handover after the handover to the first base station is rejected.

3. The method of claim 1, wherein the handover parameters of the mobile device are modified after the information is stored.

4. The method of claim 1, wherein the first value is the timing advance of the communication signal between the mobile device and the first base station.

5. The method of claim 1, wherein the second value is the time between the first and the second handover.

6. The method of claim 1, wherein the second value is the distance the mobile device was moved between the first and the second handover.

7. The method of claim 1, wherein statistics about detected cell spots are stored in the second station, in a third base station or in a central network element.

8. The method of claim 1, wherein the information is stored in a neighbor relation table.

9. The method of claim 1, wherein the information is stored in the first base station.

10. The method of claim 1, wherein the information is stored in the second base station.

11. The method of claim 1, wherein the information is stored in a third base station.

12. The method of claim 1, wherein the information is stored in a network element.

13. A non-transitory computer-readable medium storing program instructions that, when executed by a computer, cause a corresponding computer-controlled device to perform a method of detecting a cell spot of a first base station in a cellular wireless communication network using a mobile device being moved through the cell spot, the method comprising:

performing a first handover of the mobile device from a second base station to a first base station;

determining a first value, the first value being indicative of a distance between the mobile device and the first base station performing a second handover of the mobile device from the first base station;

determining a second value based on the time between the first and the second handover;

storing information being indicative of the cell spot after determining the first value is above the first threshold and the second value is below the second threshold; and rejecting a subsequent handover request for performing a handover from the second base station to the first base station after the information is stored.

14. An apparatus, comprising:

a network element configured to perform a first handover of a mobile device moving through a cell spot of a first base station in a cellular wireless communication network from a second base station to the first base station;

wherein the network element is configured to determine a first value, the first value being indicative of a distance between the mobile device and the first base station wherein the network element is configured to perform a second handover of the mobile device from the first base station;

wherein the network element is configured to determine a second value based on the time between the first and the second handover;

wherein the network element is configured to store information being indicative of the cell spot after determining the first value is above the first threshold and the second value is below the second threshold;

wherein the network element is configured to reject a subsequent handover request for performing a handover from the second base station to the first base station after the information is stored.

15. An apparatus, comprising:

a first base station configured to perform a first handover of a mobile device moving through a cell spot of the first base station in a cellular wireless communication network from a second base station to the first base station;

wherein the first base station is configured to determine a first value, the first value being indicative of a distance between the mobile device and the first base station wherein the first base station is configured to perform a second handover of the mobile device from the first base station;

wherein the first base station is configured to determine a second value based on the time between the first and the second handover;

wherein the first base station is configured to store information being indicative of the cell spot after determining the first value is above the first threshold and the second value is below the second threshold;

wherein the first base station is configured to reject a subsequent handover request for performing a handover from the second base station to the first base station after the information is stored.

16. The apparatus of claim 14, wherein at least one third base station is prepared for a handover after the handover to the first base station is rejected.

17. The apparatus of claim 14, wherein the handover parameters of the mobile device are modified after the information is stored.

18. The apparatus of claim 14, wherein the first value is the timing advance of the communication signal between the mobile device and the first base station.

19. The apparatus of claim 14, wherein the second value is the time between the first and the second handover.

20. The apparatus of claim 14, wherein the second value is the distance the mobile device was moved between the first and the second handover.

* * * * *